United States Patent Office 3,467,491
Patented Sept. 16, 1969

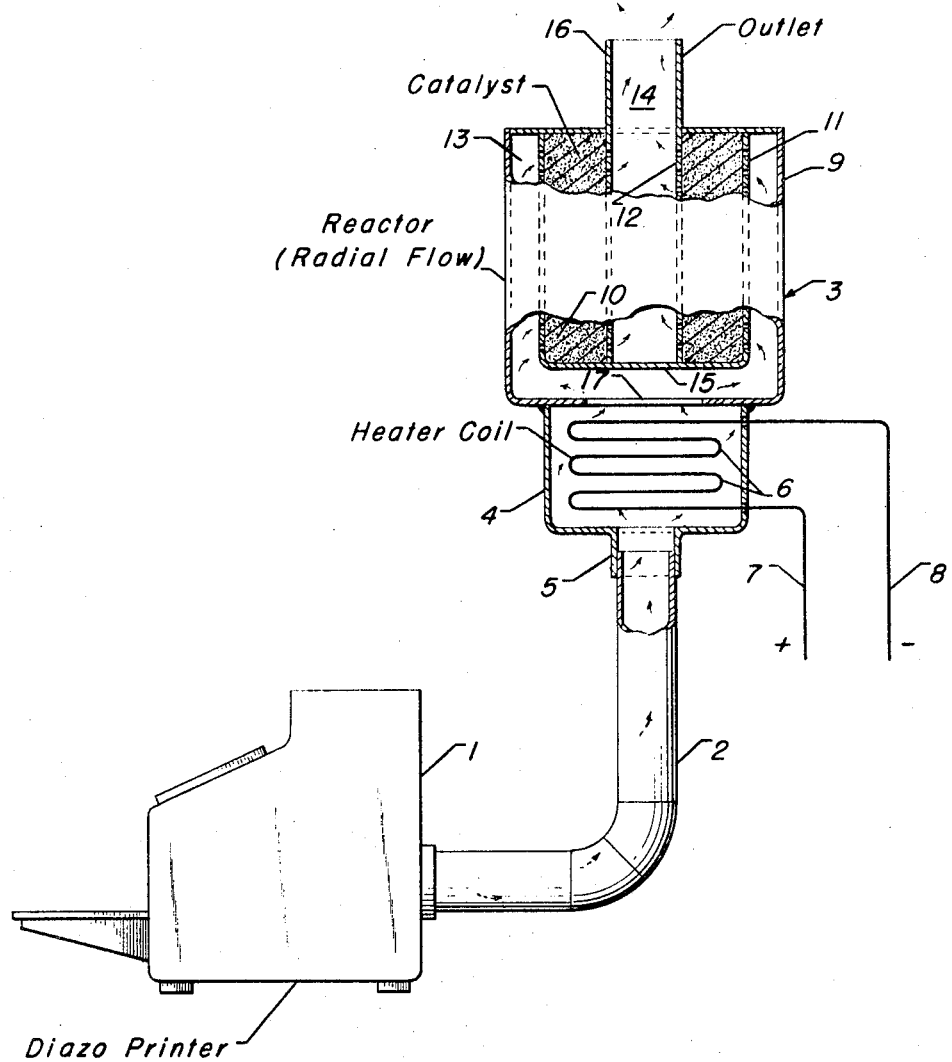

3,467,491
CATALYTIC TREATMENT OF VENT GASES CONTAINING AMMONIA
Leslie C. Hardison, Bloomer, Wis., assignor to Universal Oil Products Company, Des Plaines, Ill., a corporation of Delaware
Filed Oct. 23, 1965, Ser. No. 503,665
Int. Cl. B01d 53/34, 53/00
U.S. Cl. 23—2     4 Claims

ABSTRACT OF THE DISCLOSURE

Ammonia is removed from ammonia-containing gases by conversion thereof to nitrogen and water without production of noxious nitrogen oxides by contacting said gases and air with a platinum-alumina catalyst at a temperature from about 400° F. to about 450° F.

---

The present invention is directed to a method and apparatus means for effecting the treatment of vent gases containing ammonia and, in particular, there is provided means for substantially eliminating the discharge of harmful ammonia and nitrogen oxides into a confined work space from printing equipment using a diazo paper.

Various "dry" or "diazo-type" printers in turn utilize slightly different systems for obtaining color or printing however most of them have either aqueous ammonia or anhydrous ammonia to develop the lines or color of a print from a diazo compound, a coupler and a stabilizing acid which are impregnated into the light sensitive copy paper. The coated or impregnated papers are generally referred to as "diazo paper" even though different suppliers will use different chemical impregnations. Although ammonia vapors may be released within the printing equipment to contact but one face of the copy paper, such vapors are generally carried throughout the interior of the entire printer and will be released into the printing room unless expensive and elaborate exhaust systems are incorporated into or are attached to the printer installation. Certain data released by the National Safety Council indicates that for some people the detectable threshold for ammonia is approximately 20 parts per million and that some people notice slight eye irritation at about 40 parts per million. Concentrations of the order of 1500 parts per million are highly irritating and may be fatal. Preferably, the exhaust gases that vent from a printing machine should be treated to reduce the ammonia concentration to less than 20 parts per million for use in a well ventilated space and to provide substantially lower levels for installations in confined or poorly ventilated work spaces.

Prior associated work carried out in effecting the catalytic combustion of ammonia has invariably produced substantial quantities of the various nitrogen oxides, even though the usual high temperature catalytic conversion of ammonia in the presence of oxygen will result in primarily water vapor and nitric oxide, the latter being colorless and odorless. On the other hand, if the combustion treatment is carried out at room temperature, then there is a high combination of nitric oxide and oxygen to give the brown nitrogen dioxide. The latter is of course quite harmful with only amounts of less than 5 parts per million being considered safe. The odor of nitrogen dioxide is detectable in amounts of the order of 5 parts per million, although usually no discomfort is felt at this level. It is generally stated that at about 62 parts per million of nitrogen dioxide there will be some discomfort; however, with respect to both nitric oxide (NO) and nitrogen dioxide ($NO_2$) the harmful effects are particularly insidious because there is no immediate reaction and a person who has been exposed to the atmosphere may not experience sensations of poisoning until several hours after the exposure.

It is thus a principal object of the present invention to provide a controlled catalytic process for treating an ammonia containing vent stream whereby both the ammonia and nitrogen oxides levels will be below that which is considered harmful for a person working in a confined space.

It may also be considered an object of the present invention to provide means for utilizing a special form of supported platinum containing catalyst such that there is an optimum conversion of ammonia to nitrogen with little or no nitrogen oxides in the formation.

In one embodiment, the present invention provides a method for treating an ammonia containing vent stream without the production of harmful nitrogen oxides in a manner which comprises, collecting the ammonia vapors of said vent stream in admixture with air and passing the mixture intact with a platinum-alumina catalyst at a controlled temperature range of from about 400° to 450° F., whereby there is primarily a conversion to harmless nitrogen and water vapor.

There are of course many ways of preparing and utilizing platinum containing catalysts. Platinum and platinum group metals may be electrically plated or otherwise deposited on alloy metal base materials such that there is a high quantity of the active metal present to provide a surface contact with the stream being treated. On the other hand, relatively small quantities of an active platinum group metal may be deposited on a porous refractory inorganic oxide type of base material, such as alumina, silica, silica-alumina, etc. In carrying out the catalytic conversion of ammonia containing streams, it appears that alumina or other inorganic oxide base with a platinum group component impregnated thereon provides a catalyst composite which is superior to an all metal platinum group catalyst, such as a crimped alloy ribbon with a platinum group metal electroplated or otherwise deposited thereon. For example, in the present instance, it has been found that a platinum-alumina catalyst, where the platinum is present in an amount from about 0.1% to about 1.0% by weight of the alumina will provide for the catalytic treatment of an ammonia containing vent stream, when treating at a controlled critical temperature range, such that there are substantially no nitrogen oxides formed in the conversion and ammonia content is reduced to a safe level for subsequent venting into a confined work space. Thus, it may be seen that with the use of a suitable catalyst containing converter unit, with means for controlling temperature, there may be an incorporation into or an attachment directly onto a printing machine using a diazo paper whereby there can be elimination of expensive and elaborate exhaust fans and duct work. For the treatment of an ammonia containing vent stream, the catalyst preferably utilizes platinum as the active component; however, other platinum group metals may be combined therewith such as palladium, iridium, ruthenium, and rhodium may be utilized in small amounts in combination with the platinum. Also small quantities of other metallic composites may be utilized as for example, iron, cobalt, nickel, copper, vanadium, tungsten, molybdenum, or other noble metals including silver and gold, etc. It is understood that the catalytic activity, stability, auto-initiating temperature, and other characteristics of the catalyst of the present invenion, may vary from catalyst to catalyst. Many of the specific catalytic composites discussed herein do not necessarily yield equivalent results when compared with a catalyst comprising one or more different metallic components, or when utilized under varying conditions in different applications. Although the precise manner in which the catalytically active metallic component, such as platinum, is disposed within the carrier material, is not known with absolute certainty, it is believed that the platinum, or other metallic component, enters into a complex combination with the carrier material and other components of the catalyst. Therefore, it is understood that the use of the term "platinum" or "metallic component," for example, connotes platinum or other metallic components existing within the carrier material in a combined form and/or in the elemental state.

The catalytic composite of the present invention, and the method of the preparation which is hereinafter set forth in greater detail, utilizes a refractory inorganic oxide as the carrier material for the active metallic components hereinbefore set forth. Refractory inorganic oxides possess particular physical charactistics which readily permit adaptation to oxidation reactors. One desired physical characteristic, for example, is that extremely high temperatures do not apparently affect the capability of the material to function as desired. The refractory inorganic oxide carrier material, for utilization in the catalyst of the present invention, may be manufactured by any suitable method including separate, successive, co-precipitation means of manufacture when comprising two or more individual inorganic oxides. The carrier material may comprise naturally-occurring substances such as clays or earths, and may or may not be activated prior to use by one or more treatments including drying, calcining, streaming, or treatments with various reagents, etc. The catalytic composite of the present invention will preferably make use of an alumina-containing refractory inorganic oxide carrier material: as employed herein, the term "alumina" is intended to include porous aluminum oxide in various states of hydration. In addition to alumina, other refractory inorganic oxides may be employed, either in conjunction with, or instead of, the alumina. Other suitable inorganic oxides includes silica, boria, thoria, titania, zirconia, hafnia, and mixtures of two or more. The incorporation of any of the foregoing refractory inorganic oxides, in conjunction with the alumina, is generally dependent upon the desire to add thereto certain physical and/or chemical characteristics required by the particular application for which the catalytic composite is intended. Such other refractory inorganic oxides, for example, silica, will be present within the carrier material in an amount within the range of about 0.5% to about 25.% by weight thereof, based upon the final weight of the carrier. Intermediate quantities are preferred and will lie within the range of about 1.0% to about 10.0% by weight. The carrier material may take the form of any desired shape such as spheres, pills, extrudates, granules, cakes, briquettes, rings, etc. The preferred form is the sphere, and spheres may be continuously manufactured by the well-known oil-drop method: this method is described in detail in United States Patent No. 2,620,314 issued to James Hoekstra. In the interest of simplicity and clarity, the following discussion will be restricted to the use of alumina as the refractory inorganic oxide carrier material.

With respect to platinum impregnation, suitable water soluble compounds shall generally be utilized as an impregnating solution, such as chloro-platinic acid, chlorplatinous acid, platinous chloride, platinic chloride, etc. Where the catalytic composite is intended to contain other metallic components, such as those hereinbefore set forth, the composite may be prepared by commingling water-soluble compounds of these components, particularly the nitrates, sulfates, chlorates, chlorides, or carbonates, and immersing the particles of the carrier material therein, followed by heating to form the corresponding oxides of the metallic components.

The quantity of the catalytically active metallic components is based upon the volume of the carrier material to be combined therewith, and is calculated on the basis of the elemental metal, notwithstanding that the metallic component may exist in some combined complex form, or in the elemental state. Thus, with respect to platinum-group metals, the platinum will be present in an amount of from about 0.05 to about 2.0 troy ounces per cubic foot of carrier material. The preferred range of the concentration of the platinum component, dictated by economic considerations, is from about 0.15 to about 0.60 troy ounce per cubic foot of carrier material. The other metallic components, either in conjunction with, or instead of the platinum component, will be present in an amount of from about 0.01 to about 2.0 troy ounces per cubic foot of carrier material employed.

The resulting impregnated spheres are evaporated to dryness in a rotating dryer at a temperature of about 210° F. Subsequent, to the impregnation and drying steps in the catalyst preparation, there may be a conventional high pressure calcination step where, in the presence of air, the catalyst is oxidized for at least about 2 hours at a temperature above 1000° F. Also, it appears that improved activation and catalyst performance may be obtained by effecting a "burn-in" or preconditioning treatment where there is the treating of the catalyst particles in the presence of a hydrocarbon compound at a temperature of above about 600° F. and generally above about 1000° F. For example, hydrocarbon vapors from the injection of hexane or other hydrocarbon compound into an air stream carrying to the catalyst, for at least about a one-half hour period or such time as required to observe burning on the surface of the catalyst, will activate the surface of the catalyst particles for improved ammonia conversion in the treatment of a vent gas stream. Generally a catalyst subjected to this preconditioning will be free of chloride or other entrained halogen which may be present from the impregnation step.

Reference to the accompanying drawing and the following description thereof will serve to show one embodiment of catalytic converter for use in combination with apparatus having ammonia vapors being discharged therefrom.

Referring now to the drawing, there is indicated diagrammatically a diazo printer 1 with a vent line 2 connecting with a catalytic reactor chamber 3. It is to be understood that the present drawing is not to scale and that the reactor means 3 might well be of a size and design which is readily adaptable for installation within the cabinet portion of printer equipment, as well as exteriorly thereof, such that the ammonia containing vent stream collected from within the cabinet portion of the printer may be drawn through the catalytic converter portion and a resulting treated, harmless vent gas stream be discharged from the cabinet portion of the printer 1.

Specifically, with respect to reactor 3 of the drawing, there is an inlet section 4 having an inlet port 5 and an internally positioned electric heating coil 6. The latter is shown as being supplied a suitable electric power source by way of lines 7 and 8. The heater coil 6 may be formed of a conventional type of resistance wire or may comprise one or more sections of "calrod" type of heater unit. In any event, the heater coil 6 shall be suitably placed within the inlet section 4 such that the vent gases passing therethrough will be preheated to a temperature of the order of 400° F. prior to entering the shell portion 9 which in turn holds a catalyst bed 10. Although not shown, suitable thermocouple or other temperature sensitive means may be positioned downstream from the heater coil 6 and in turn made connective with automatic switching means from the electrical power source to the coil such that there may be automatic control of the temperature leaving the section 4. The catalyst section 10, in the present embodiment, is shown as being of annular shape or as having a hollow cylinder-like configuration, with catalyst particles being held in a fixed bed between an outer screen or perforate member 11 and and an inner screen or perforate plate member 12. Screen 11 is placed a spaced distance inwardly from the housing wall 9 such that there is an annular space 13 for the ammonia containing stream to surround the catalyst 10 and pass in a radial inward flow therethrough to a central passageway 14. The latter is blocked upstream by a suitable non-perforate plate 15 but is open at a downstream end to connect with a suitable outlet conduit 16. There is of course an internal opening or passageway 17 between the inlet section 4 and the catalyst housing 9 whereby the heated vent gas stream may readily enter the space 13 and surround the catalyst bed 10.

As hereinbefore set forth, the ammonia vapors within the vent stream will be contacting catalyst particles 10, such as alumina with a small percentage of platinum activation, whereby there will be substantially complete conversion and elimination of the ammonia in the stream to permit the discarge of a stream from outlet 16 with less than 5 parts per million of the ammonia remaining in the stream. In addition, where the catalytic conversion is carried out at a controlled temperature within the range of 400° to about 450° F., there will be substantially no nitrogen oxides formed during the conversion, which in turn could provide poisoning to such persons that may be constantly near the printer equipment in a confined work space.

In one specific instance, the catalyst within bed 10 may comprise $\frac{1}{16}''$ to $\frac{1}{8}''$ round spherical type alumina particles impregnated with platinum to have approximately 0.5% to about 1.0% platinum by weight of the alumina base; however, lesser or greater amounts may be utilized to provide optimum conversion for a particular ammonia vapor vent stream treatment such that the resulting discarge will have ammonia vapors and nitrogen oxides in only small permissible quantities of a few parts per million, or merely fractional parts per million.

The following examples will serve to provide comparative data showing that a small quantity of active platinum impregnated upon a refractory oxide base is of economic advantage and quite satisfactory for providing substantially complete conversion of the ammonia in the vent gas stream to nitrogen and water vapor so that there will be no harm to persons in a confined area around a printer unit using diazo paper to obtain reproductions or prints from original copies fed into such unit.

Example I

In one test operation, an ammonia containing vent stream, from a typical small commercial diazo printer, was passed over an all metal catalyst test unit which was a $2\frac{1}{8}''$ diameter by $2\frac{1}{4}''$ long size of crimped chrome-nickel alloy ribbon with an electro-plated 50–50 platinum-palladium coating. This catalyst unit was in an elongated tube and placed downstream from an electric heater coil. The printer unit itself has an exhaust fan and normally discharges at a rate of the order of 220 s.c.f.m. and at about 98.5° F. with some 500 parts per million of ammonia. However, for the small all metal catalyst test unit being used in this instance, it was necessary to reduce the rate of the vent stream to about 2.2 s.c.f.m. to permit the stream to be properly heated and the ammonia concentration was increased to approximately 5000 parts per million to simulate entrapment of the ammonia normally evolved in a 22 s.c.f.m. stream of air.

At a temperature of about 700° F. through the bed, there was a substantially complete conversion of the $NH_3$, but a production of approximately 300 parts per million of nitrogen oxides. The test for the nitrogen oxides was carried out with the use of a standard Draeger Tester unit.

Example II

In a second operation which was similar to that set forth for Example I except that the vent stream was passed through the catalyst test unit at about 525° F., there was noticeable signs of unburned ammonia in the effluent stream. The nitrogen oxides content was however reduced and was of the order of about 100 parts per million.

Example III

In a third operation which again was similar to that set forth for Examples I and II except that the vent stream was passed through the catalyst test unit at about 550° F., there was noticeable unburned ammonia fumes in the effluent stream. Also, a test for the nitrogen oxides content showed that there was of the order of 100 parts per million remaining in the effluent stream.

Example IV

In a different type of test operation, the effluent stream at the reduced rate of about 1.5 s.c.f.m. from the printer unit was passed into contact with a 3″ deep bed of an alumina-platinum catalyst at a temperature of the order of 300° F. This catalyst comprised $\frac{1}{16}''$ alumina spheres which had been prepared by an oil-drop method and then impregnated with a chloroplatinic acid to provide 0.75% platinum by weight thereof on a resulting dried and calcined catalyst. Calcination was effected in the presence of air at about 1000° F. The catalyst pills in this instance had also been subjected to a preconditioning treatment where there was a heating of the "finished" catalyst at about 1000° F. in the presence of hydrocarbon vapors for about a half hour period.

In this instance, the resulting conversion of ammonia was determined to be only about 68% and nitrogen oxides formation about 1.0 parts per million.

Example V

Another test operation which was carried out in a manner similar to that of Example IV, except that a higher inlet temperature to the catalyst bed was used at about 406° F. This operation resulted in a calculated 99.5% conversion of the ammonia and only about 1.0 parts per million of nitrogen oxides.

Example VI

In this test operation, there was the treating of the ammonia containing vent stream in a manner similar to that described for Examples IV and V; except however, in this instance a larger quantity of alumina-platinum catalyst particles (about 1.44 pounds) were placed in an annular shaped cartridge similar to that shown in the accompanying drawing. Also, the catalyst was used without the hydrocarbon pretreatment or "burn-in." In other words, the catalyst particles were used in a finished state following drying and high temperature calcination in the presence of air at about 1000° F. The ammonia stream was charged to the reactor at an inlet temperature of about 410° F. and at a rate of about 20 s.c.f.m. The results of this test were very poor, in that the test room was rapidly filled with white clouds of ammonium chloride powder, $NH_4Cl$.

Example VII

In another test operation, the calcined $\frac{1}{16}''$ alumina-platinum particles, such as used in Example VI, were subjected to reduction by placing them in a hydrogen atmosphere for two hours at 1000° F. Subsequently, when trying them in a conversion test under the conditions similar to those for Example VI, there were no better results than when using the fresh calcined catalyst.

Example VIII

In still another test, the calcined $\frac{1}{16}''$ alumina-platinum particles were subjected to reduction in the presence of a stream comprising 1% methane, $2\frac{1}{2}$% oxygen and the remainder nitrogen for about two hours at 1150° F. When this catalyst was tested for ammonia conversion, the charge stream was introduced at 410° F. and there was found only about 2 parts per million of nitrogen oxides in the exit stream and not sufficient ammonia remaining to be detected by smell, or to give any white $NH_4Cl$ discharge.

Various methods of catalyst "conditioning" have been tried experimentally. In one instance it appears that the catalyst can be treated satisfactorily where it can be exposed uniformly to hexane or "white gas" vapors at about 1000° F. to 1100° F. for a time sufficient to obtain catalytic burning of the gas over the whole surface of each catalyst particle. In another instance, it appears that good "conditioning" can be obtained by spreading the particles over a fine mesh alloy distributor screen surface to a depth of about ½" and then diffusing a stoichiometric mixture of methane and air through the bed to effect burning thereon. Initially there will be flame from the outer face of the layer, but subsequently there will be catalytic burning of the methane on the surface of the catalyst and a glow of the entire bed. Such burning should be continued for about one-half hour and then should be some stirring of the catalyst to insure a uniform "burn-in" treatment on all of the catalyst surface.

In comparing the results of the foregoing examples it will be noted that the spherical form alumina-platinum catalysts were far more satisfactory for converting the ammonia than was the all metal platinum-palladium coatings and also produced less of the harmful nitrogen oxides. More importantly, it will be observed that the conversions carried out in the 400° F. to 450° F. temperature range provided better conversion of the ammonia with minimum nitrogen oxides formations. Still further, it will be noted that the hydrocarbon pretreatment step is of a definite value in improving the conversion activity of the catalyst.

I claim as my invention:

1. A method for treating an ammonia vapor containing vent stream without production of noxious nitrogen oxides, which comprises, collecting the ammonia vapors of said vent stream in admixture with air and passing the mixture into contact with a platinum-alumina catalyst at a controlled temperature range of from about 400° F. to about 450° F. to effect a conversion to primarily harmless nitrogen and water vapor.

2. The method of claim 1 further characterized in that said platinum-alumina catalyst has platinum in an amount from about 0.1% to about 1.0% by weight of the alumina.

3. A method for treating an ammonia vapor containing vent stream without production of noxious nitrogen oxides, which comprises, collecting the ammonia vapors of said vent stream in admixture with air and passing the mixture into contact with an alumina-platinum catalyst having an oxidized coating thereon as hereinafter set forth at a controlled temperature range of from about 400° F. to about 450° F. to effect a conversion of the ammonia content thereof primarily to harmless nitrogen and water vapor, and said catalyst has prior to use been subjected to the burning of a hydrocarbon vapor thereon in excess air at a temperature above about 600° F. to form an oxidized coating.

4. The method of claim 3 further characterized in that said ammonia containing vent stream being treated is produced from the use of ammonia fumes in a printer unit in turn utilizing a light sensitive diazo paper.

References Cited

UNITED STATES PATENTS 3,198,604    8/1965    Pfefferle _____ 23—220 X

OTHER REFERENCES

Mellor, "A Comprehensive Treatise on Inorganic and Theoretical Chemistry," Longmans, Green & Co., New York, volume VIII, 1928, p. 210.

OSCAR R. VERTIZ, Primary Examiner

E. C. THOMAS, Assistant Examiner

U.S. Cl. X.R.

23—4, 162, 220; 252—466